United States Patent
Miyamoto et al.

(10) Patent No.: US 10,126,493 B2
(45) Date of Patent: Nov. 13, 2018

(54) METHOD AND APPARATUS FOR FABRICATION OF METAL-COATED OPTICAL FIBER, AND THE RESULTING OPTICAL FIBER

(71) Applicants: AFL TELECOMMUNICATIONS LLC, Duncan, SC (US); FUJIKURA LTD., Tokyo (JP)

(72) Inventors: Matsuhiro Miyamoto, Chiba (JP); John J. D'Urso, Shrewbury, MA (US); Takuya Fujimoto, Tokyo (JP); Masateru Ichikawa, Tokyo (JP)

(73) Assignees: AFL Telecommunications LLC; Fujikura LTD. (JP)

( * ) Notice: Subject to any disclaimer, the term of this patent is extended or adjusted under 35 U.S.C. 154(b) by 0 days.

(21) Appl. No.: 15/510,297

(22) PCT Filed: Sep. 17, 2015

(86) PCT No.: PCT/US2015/050684
§ 371 (c)(1),
(2) Date: Mar. 10, 2017

(87) PCT Pub. No.: WO2016/044591
PCT Pub. Date: Mar. 24, 2016

(65) Prior Publication Data
US 2017/0285261 A1    Oct. 5, 2017

Related U.S. Application Data

(60) Provisional application No. 62/051,659, filed on Sep. 17, 2014.

(51) Int. Cl.
G02B 6/02    (2006.01)
G02B 6/036    (2006.01)
(Continued)

(52) U.S. Cl.
CPC ...... *G02B 6/02395* (2013.01); *C03C 17/3697* (2013.01); *C23C 18/1653* (2013.01);
(Continued)

(58) Field of Classification Search
CPC .... G02B 1/16; G02B 6/02395; C03C 25/108; C03C 25/16; C03C 2217/253; C03C 2217/261; C23C 18/1653
(Continued)

(56) References Cited

U.S. PATENT DOCUMENTS 3,506,546 A * 4/1970 Toledo ................. C25D 7/0607
204/206
3,894,924 A * 7/1975 Toledo ................... C25D 3/562
204/206
(Continued)

FOREIGN PATENT DOCUMENTS

DE    2306778 A1    8/1974
DE    2647108 A1    4/1978
(Continued)

OTHER PUBLICATIONS

AFL Telecommunications LLC; International Patent Application No. PCT/US2015/050684; International Search Report; dated Jan. 27, 2016; (1 page).
(Continued)

*Primary Examiner* — Robert Tavlykaev
(74) *Attorney, Agent, or Firm* — Dority & Manning, P.A.

(57) ABSTRACT

Method and apparatus for producing metal-coated optical fiber involves feeding a length of glass fiber through a first solution bath so as to plate a first predetermined metal on the glass fiber via electroless deposition. The length of glass fiber is passed continuously from the first solution bath to a second solution bath adapted to plate thereon a second predetermined metal via electrolytic plating such that the
(Continued)

optical fiber contacts an electrode only after at least some of the second predetermined metal has been applied. The length of glass fiber may be passed continuously from the second solution bath to a third solution bath adapted to plate thereon a third predetermined metal via electrolytic plating.

14 Claims, 5 Drawing Sheets

(51) Int. Cl.

| | | |
|---|---|---|
| *C03C 17/36* | (2006.01) | |
| *C03C 25/106* | (2018.01) | |
| *C03C 25/1065* | (2018.01) | |
| *C25D 3/12* | (2006.01) | |
| *C25D 3/38* | (2006.01) | |
| *C25D 5/34* | (2006.01) | |
| *C25D 7/06* | (2006.01) | |
| *C23C 18/16* | (2006.01) | |
| *C23C 18/18* | (2006.01) | |
| *C23C 18/32* | (2006.01) | |
| *C23C 18/40* | (2006.01) | |
| *C25D 5/54* | (2006.01) | |
| *C25D 17/10* | (2006.01) | |
| *C25D 17/12* | (2006.01) | |

(52) U.S. Cl.
CPC ...... *C03C 25/1063* (2018.01); *C03C 25/1068* (2018.01); *C03C 2217/253* (2013.01); *C03C 2217/261* (2013.01); *C03C 2218/111* (2013.01); *C03C 2218/115* (2013.01); *C23C 18/1632* (2013.01); *C23C 18/1893* (2013.01); *C23C 18/32* (2013.01); *C23C 18/40* (2013.01); *C25D 3/12* (2013.01); *C25D 3/38* (2013.01); *C25D 5/34* (2013.01); *C25D 5/54* (2013.01); *C25D 7/0607* (2013.01); *C25D 17/10* (2013.01); *C25D 17/12* (2013.01)

(58) Field of Classification Search
USPC .......................... 385/123, 128; 65/430–432
See application file for complete search history.

(56) References Cited

U.S. PATENT DOCUMENTS

| | | | |
|---|---|---|---|
| 3,956,077 A | 5/1976 | Hamby, Jr. et al. | |
| 4,769,114 A * | 9/1988 | Podrini ................. | C25D 7/0628 |
| | | | 204/206 |
| 4,932,749 A | 6/1990 | Haidle et al. | |
| 5,093,880 A | 3/1992 | Matsuda et al. | |
| 5,925,462 A * | 7/1999 | Girgis ..................... | C03C 25/28 |
| | | | 385/103 |
| 5,944,965 A | 8/1999 | Ameen et al. | |
| 6,830,672 B2 | 12/2004 | Okamoto | |
| 2003/0039458 A1* | 2/2003 | Miller ................... | C03C 25/108 |
| | | | 385/128 |
| 2003/0173226 A1* | 9/2003 | Grunwald ................. | C25D 5/54 |
| | | | 205/159 |
| 2005/0141830 A1 | 6/2005 | Peret | |
| 2006/0251370 A1 | 11/2006 | Onosato et al. | |
| 2012/0214040 A1* | 8/2012 | Tsutsumi ............... | H01G 11/26 |
| | | | 429/99 |
| 2012/0219844 A1* | 8/2012 | Tsutsumi ............... | H01G 11/06 |
| | | | 429/153 |

FOREIGN PATENT DOCUMENTS

| | | | | |
|---|---|---|---|---|
| FR | 1485049 A | | 6/1967 | |
| JP | 61-117136 | * | 6/1986 | ............. C03C 25/04 |
| JP | 2011-64746 | * | 3/2011 | ............... G02B 6/44 |
| WO | WO2002/041054 A1 | | 5/2002 | |

OTHER PUBLICATIONS

AFL Telecommunications LLC; European Application No. EP15841384; Supplementary European Search Report; dated Apr. 20, 2018; (2 pages).

* cited by examiner

FIG. 1

Table.1

| | Example1 | Example2 | Example3 | Example4 |
|---|---|---|---|---|
| Optical fiber diameter (micron) | 125 | 125 | 125 | 125 |
| Carbon layer (micron) | <0.1 | <0.1 | <0.1 | <0.1 |
| Inner metal (electroless plating) | Ni-P alloy | Cu | Cu | Cu |
| Inner metal thickness (micron) | 3 | 3 | 2.5 | 1 |
| Outer metal (electrolytic plating) | none | none | Ni | Cu |
| Outer metal thickness (micron) | none | none | 1.7 | 3.4 |
| Outer diameter (micron) | 131 | 131 | 133 | 134 |
| Bending test before heat treatment (10mm dia.) | Passed | Passed | Passed | Passed |
| Bending test after heat treatment (10 mm dia, air, 500 deg.C, 5 hrs) | Broken | Broken | Broken | Broken |
| Bending test after heat treatment (10mm dia, nitrogen, 500 deg.C, 5 hrs) | Broken | Cracked | Passed | Cracked |

METHOD AND APPARATUS FOR FABRICATION OF METAL-COATED OPTICAL FIBER, AND THE RESULTING OPTICAL FIBER

CROSS-REFERENCE TO RELATED APPLICATIONS

This application is based upon and claims the benefit of priority from U.S. Provisional Patent Application No. 62/051,659, filed Sep. 17, 2014 in the U.S. Patent and Trademark Office, and as a U.S. national stage filing of International Application No. PCT/US2015/050684 having an international filing date of Sep. 17, 2015, the disclosures of both of which are incorporated by reference herein in their entireties.

BACKGROUND OF THE INVENTION

The present invention relates to optical fiber. More particularly, the present invention relates to metal-coated optical fiber, and techniques for manufacturing same.

Optical fiber is typically constructed having a polymer coating, but some applications necessitate the use of metal-coated optical fiber. For example, distributed fiber sensing technology for temperature, acoustic vibration and strain have become popular in oil and gas well monitoring. The well temperature in oil sands or super heavy oil reservoir sometimes becomes more than 300 deg. C. because thermal extraction enhancement is applied frequently. Current polymer coated fiber does not keep its original mechanical properties against such high temperatures. Thus, metal coated fiber is applied for high temperature environment instead of polymer coated fiber.

Metal coated fibers such as aluminum, copper and gold are commercially available. But all of these fibers have thick metal layers more than 20 micron because dipping methods are applied for their manufacture. In particular, bare fiber is dipped into molten metal during passing coating die filled with molten metal and then frozen on the fiber surface. One disadvantage of these fibers is larger attenuation because thicker coating thickness of around 20-30 micron and thermal contraction by freezing leads to additional loss. For example, a typical loss of copper coated fiber with 125 micron of glass diameter and 20 micron thickness of copper is around 10 dB/km at 1310 nm.

As an alternative manufacturing method of metal coated fiber, it was reported that a low loss metal coated fiber was made by a plating method. (International Wire & Cable Symposium Proceedings 1991, pages 167-171.) The attenuation of the reported fiber with 125 micron glass and 2.5 micron of nickel layer is 0.7 dB/km at 1300 nm. The structure of metal coated fiber made by plating is described in U.S. Pat. No. 5,093,880, which is incorporated herein by reference for all purposes. But long metal coated fiber made by plating is not yet commercialized due to the difficulty of handling bare fiber. A method of manufacturing metal coated fiber by plating without degrading mechanical reliability is disclosed in application no. PCT/US2014/028151 (published on Sep. 25, 2014 as WO 2014/152896). U.S. Pat. No. 5,093,880 and application no. PCT/US2014/028151 are both incorporated fully herein by reference for all purposes.

As for the performance of temperature resistance, only loss performance under high temperature was previously described. The bending performance after heat treatment or ductility against high temperature environment was not reported. However, retaining ductility after heat treatment is an important mechanical performance characteristic for downhole cable. In this regard, sensing cable is installed into well repeatedly for logging. Thus, repeated mechanical movement is applied to the sensing cable. And even sensing cable installed permanently has been affected by mechanical vibration and other mechanical movement that occurs during well production and operation. Thus, keeping ductility after heat treatment as well as loss performance are important criteria in the downhole application.

The present invention recognizes the foregoing considerations, and others, of the prior art.

SUMMARY OF THE INVENTION

In accordance with one aspect, the present invention provides a method for producing metal-coated optical fiber. This method comprises feeding a length of glass fiber through a first solution bath so as to plate a first predetermined metal on the glass fiber via electroless deposition. The length of glass fiber is then passed continuously from the first solution bath to a second solution bath adapted to plate thereon a second predetermined metal via electrolytic plating such that the optical fiber contacts an electrode only after at least some of the second predetermined metal has been applied. According to exemplary methodology, the length of glass fiber may also be continuously passed from the second solution bath to a third solution bath adapted to plate thereon a third predetermined metal via electrolytic plating. For example, the first and second predetermined metals may be copper with the third predetermined metal being nickel.

Other aspects of the present invention provide an optical fiber comprising a glass fiber including a core and a cladding. The optical fiber further includes a multi-layer metal coating comprising a first layer of copper, a second layer of copper, and a third layer of nickel. The first layer is applied through an electroless process and the second and third layers are applied through respective electrolytic processes. For example, the combined thickness of the first layer of copper and the second layer of copper may be at least about 5 microns, with the thickness of the first layer of copper being no greater than about 0.5 microns. In addition, the thickness of the third layer of nickel may be at least about 0.5 microns. The optical fiber preferably has a length greater than one meter, such as a length between one and ten kilometers in length.

Other objects, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying drawings, in which.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

Figure 1:
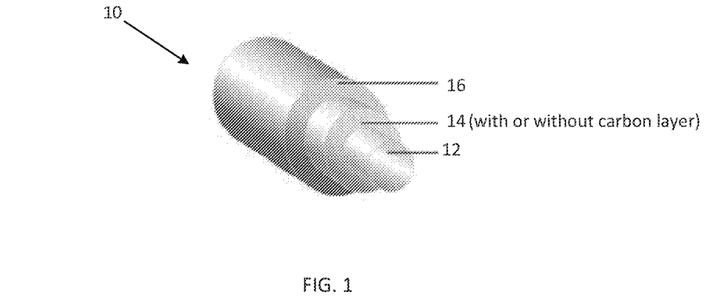
FIG. 1 is a perspective diagrammatic view of a metal-coated optical fiber with layers cut away but without showing individual metal layers.

The present invention provides various improvements in metal-coated optical fiber and methods of making the same. Referring now to FIG. 1, an exemplary metal-coated fiber 10 is illustrated. Fiber 10 includes a glass fiber having a core 12 and a cladding 14. A metal coating 16 surrounds and contains the cladding/core combination. As will be described more fully below, metal coating 16 may often be formed of a plurality of metal layers applied by a combination of electroless and electrolytic plating. Typically, combinations of electroless copper, electrolytic copper, and electrolytic nickel can be used. The resulting fiber will typically have a desirable combination of low transmission loss and good ductility.

As further background, the inventors investigated optimal structure of metal coating based on plating method to meet the dual requirements of low loss performance and of keeping ductility after heat treatment. In this regard, short pieces of metal coated fiber were made using carbon coated fiber and tested after heating to find optimal metal structure for meeting the requirements of downhole cable. Carbon coating is often desirable because it will inhibit mechanical degradation by protecting humidity permeation from aqueous solutions of plating and hydrogen permeation generated during plating. One skilled in the art will appreciate, however, that fiber without a carbon coating can also be applicable.

I. Single Layer Structure

Optical fiber is made of fuzed quartz, which is nonconductive. Even if a carbon layer is coated on glass, the conductance is not sufficient for electrolytic plating due to thickness of less than 100 nm. The first metallic layer should be applied on bare optical fiber by electroless plating regardless of metal kind. We formed nickel phosphorous alloy or copper by electroless plating in accordance with the following process.

Example 1 (Nickel Phosphorous Alloy Electroless Plating)

Step 1 (Removing temporary coating)—An optical fiber was provided that was coated with carbon coating (specifically, amorphous carbon coating) and secondly coated with temporary plastic coating for mechanical protection which is soluble with water (as described in application no. PCT/US2014/028151). The fiber was dipped into a container with deionized water for five minutes at approximately 60 deg. C., to eliminate the temporary coating and any contamination deposited on the carbon coating.

Step 2 (Tin attachment)—A carbon coated bare fiber with 125 micron diameter was dipped in the next container with aqueous solution containing 100 ml/L of a tin attachment solution (in this case, 20-330001 "sensitizer" made by Okuno Chemical Industries) for two minutes at approximately 50 deg. C.

Step 3—The tin attachment solution ("sensitizer") deposited on the optical fiber was washed away with water.

Step 4 (Pd attachment)—The optical fiber coated with the carbon coating was dipped in a container filled with an aqueous solution containing 70 ml/L of an activating reagent (in this case, E20-330003 "Activator" made by Okuno Chemical Industries) for two minutes at approximately 50 deg. C.

Step 5—The activating reagent was washed away with water.

Step 6 (nickel coating formation by electroless plating process)—The optical fiber coated with the carbon coating was dipped in a container filled with nickel phosphorous solutions of 120 ml/L of IPC nicoron GM-NP-M and 70 ml/L of IPC nicoron GM-NP-1 (GM-NP-M and GM-NP-1 made by Okuno Chemical Industries) for 27 minutes at approximately 80 deg. C. As a result, a Ni alloy coating having a thickness of approximately 3 micron was formed on the carbon coating.

Step 7—The electroless plating solution deposited on the Ni coating was washed away with water.

Step 8—The optical fiber having the Ni coating was then suitably dried.

The resulting optical fiber comprised the silica based glass optical fiber having a core diameter of 10 micron and cladding having an outer diameter of 125 micron. The amorphous carbon coating coated on the cladding had a thickness of 500 Å, and the Ni coating had a thickness of approximately 3 micron. Namely, an optical fiber coated by the electrically conductive metal, i.e., the Ni layer, having a diameter of approximately 131 micron was formed. The carbon coating and the Ni coating were in good contact with each other, and thus the Ni coating was not peeled from the carbon coating when the optical fiber was bent. The optical fiber with Ni coating was heated inside oven in air atmosphere for 5 hours at 500 degree C. After heating, the optical fiber became brittle. The fiber was broken when the fiber was bent. The same fiber was heated in nitrogen atmosphere for 5 hours at 500 deg. C. and then, a bending test was done. This fiber was also broken by bending.

Example 2 (Copper Electroless Plating)

In this sample, a copper (Cu) coating was formed on the fiber's carbon coating by the electroless plating process. Accordingly, the steps 1 through 5 were almost the same as Example 1 except for temperature of step 2 and step 4. Specifically, a temperature of 45 degree C. was applied for both steps instead of 50 degree C. The following steps were carried out after step 5.

Step 6 (copper coating formation by electroless plating process)—The optical fiber coated with the carbon coating was dipped in the a container filled with aqueous copper solutions of 72 ml/L of OPC copper HFS-A, 150 ml/L of OPC copper HFS-M and 4 ml/L of OPC copper HFS- Cnicoron GM-NP-M and 7.3 ml/L of electroless copper R-H (HFS-A, HFS-M, HFS-C, R-H made by Okuno Chemical Industries) for 15 minutes at approximately 45 deg. C.

Step 7—The electroless plating solution deposited on the Cu coating was washed away with water.

Step 8—The optical fiber having the Cu coating was dried.

As a result, a Cu coating having a thickness of approximately 3 micron was formed on the carbon coating. Namely, an optical fiber coated by the electrically conductive metal, i.e., the Cu layer, having a diameter of approximately 131 micron was formed. The carbon coating and the Cu coating were in good contact with each other, and thus the Cu coating was not peeled from the carbon coating when the optical fiber was bent in the diameter of 10 mm. The optical fiber with Cu coating was heated inside oven in air atmosphere for 5 hours at 500 degree C. After heating, the coating of optical fiber was cracked and peeled off. The fiber was broken when the fiber was bent at 10 mm diameter because metal coating did not work for protective coating. According to the results of Examples 1 and 2, initial bending performance was good before heating but it lost ductility after heat treatment in air and fiber was broken by bending. Optical fibers were heated under nitrogen atmosphere and gave bending of 10 mm in diameter. The fiber broke by bending again. But cracked carbon was porous and still soft but was peeled off partially. So the breakage was caused by handing glass fiber without coating.

II. Double Layer Structure

Example 3 (Electroless Copper and Electrolytic Nickel Plating)

In this sample, a copper (Cu) coating was formed on the carbon coating by the electroless plating process, and a nickel (Ni) coating was formed on the Cu coating by eletrolytic plating. Accordingly, the following steps were carried out after steps 1 through 6 of Example 2.

Step 6a (Cu coating formation by electroless plating process)—The optical fiber coated with the carbon coating was dipped in a container filled with aqueous copper solutions of 72 ml/L of OPC copper HFS-A, 150 ml/L of OPC copper HFS-M and 4 ml/L of OPC copper HFS-Cnicoron GM-NP-M and 7.3 ml/L of electroless copper R-H (HFS-A, HFS-M, HFS-C, R-H made by Okuno Chemical Industries) for 12 minutes at approximately 45 deg. C. As a result, a Cu coating having a thickness of 2.5 micron was formed on the carbon coating.

Step 7a—The optical fiber was washed with water.

Step 8a (Acid activation)—The optical fiber coated with the carbon coating and the Cu coating was dipped in a container filled with acid solutions (Sulfuric acid 100 g/L) for 0.5 minutes at room temperature (RT) for activation.

Step 9a (Ni coating formation by electrolytic plating process)—The optical fiber coated with the carbon coating and the Cu coating was dipped in a container filled with aqueous solutions (300 g/L of nickel (II) sulfamate tetrahydrate, 5 g/L of nickel (II) chloride hexahydrate and 40 g/L of boric acid) for 9 minutes at approximately 40 deg. C. with 1A/dm2 of current.

Step 7—The electrolytic plating solution deposited on the Ni coating was washed away with water.

Step 8—The optical fiber having the Ni coating was dried.

As a result, a Ni coating having a thickness of 1.7 micron was formed on the Cu coating. Namely, an optical fiber coated by electrically conductive metal, i.e., the Cu and Ni layers, having a diameter of approximately 133 micron was formed. The carbon coating and the Cu/Ni coating were in good contact with each other, and thus the Cu/Ni coating was not peeled from the carbon coating when the optical fiber was bent in the diameter of 10 mm The optical fiber with Cu/Ni coating was heated inside oven in air atmosphere for 5 hours at 500 degree C. The fiber broke by bending after heat treatment under air. But the same fiber passed bending test after heat treatment of 5 hours at 500 deg. C. in nitrogen atmosphere.

Example 4 (Electroless Copper and Electrolytic Copper Plating)

In this sample, a copper (Cu) coating was formed on the carbon coating by the electroless plating process, and a copper (Cu) coating was formed on the Cu coating by eletrolytic plating. Accordingly, the following steps were carried out after steps 1 through 6 of Example 2.

Step 6b (Cu coating formation by electroless plating process)—The optical fiber coated with the carbon coating was dipped in a container filled with aqueous copper solutions of 72 ml/L of OPC copper HFS-A, 150 ml/L of OPC copper HFS-M and 4 ml/L of OPC copper HFS-Cnicoron GM-NP-M and 7.3 ml/L of electroless copper R-H (HFS-A, HFS-M, HFS-C, R-H made by Okuno Chemical Industries) for 9 minutes at approximately 45 deg. C. As a result, a Cu coating having a nominal thickness of 1 micron was formed on the carbon coating.

Step 7b—The optical fiber was washed with water.

Step 8b (Acid activation)—The optical fiber coated with the carbon coating and the Cu coating was dipped in a container filled with acid solutions (Sulfuric acid 100 g/L) for 0.5 minutes at RT for activation.

Step 9 (Cu coating formation by electrolytic plating process)—The optical fiber coated with the carbon coating and the Cu coating was dipped in a container filled with aqueous solutions (70 g/L of copper sulfate, 200 g/L of sulfuric acid, hydrochloric acid 50 ml/L, 2.5 ml/L of top lucina 81 HL, and 10 ml/L of top lucina make up (top lucina 81 HL, top lucina make up, made by Okuno Chemical Industries) for 24 minutes at approximately RT with 1A/dm2 of current. As a result, a Cu coating having a thickness of 4.4 micron in total including electroless copper was formed. Namely, an optical fiber coated by electrically conductive metal, i.e., the Cu layer, having a diameter of approximately 134 micron was formed. The carbon coating and the Cu/Cu coating were in good contact with each other, and thus the Cu/Cu coating was not peeled from the carbon coating when the optical fiber was bent in the diameter of 10 mm. The optical fiber with Cu/Cu coating was heated inside oven in air atmosphere for 5 hours at 500 degree C. The fiber broke by bending after heat treatment under air. But the same fiber passed bending test after heat treatment of 5 hours at 500 deg. C. in nitrogen atmosphere. And the surface of metal layer was cracked and peeled off partially.

Figure 2:
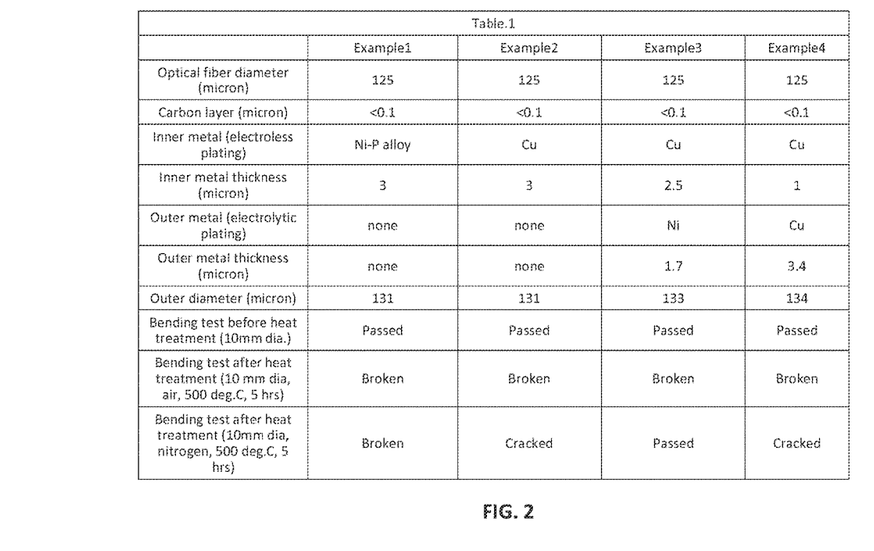
FIG. 2 is a table showing characteristics and performance of various examples of metal-coated optical fiber.

The characteristics of four fibers are summarized in Table 1 of FIG. 2. As can be seen, Example 2 and Example 4 showed no breakage against bending after heat treatment but the coating surface was cracked and glass portion was exposed partially according to the observation of SEM (scanning electron microscope). It is known that nickel phosphorous alloy made by electroless plating changes its brittleness by heat aging (See Wolfgang Riedel, Electroless Nickel Plating). In general, electroless nickel has less ductility than that of electrolytic nickel. Comparing effect of air and nitrogen of heat treatment, nitrogen heat treatment gave less degradation of ductility. It is known that oxidation speed of nickel is lower than that of copper. This was verified comparing Example 3 and Example 4.

Japanese patent P2011-64746A, incorporated herein by reference in its entirety for all purposes, includes three layer structure of metal coating, namely electroless copper, electrolytic copper, and amorphous nickel. The amorphous nickel described in the patent is made by electroless nickel plating as nickel phosphorous alloy or nickel boron alloy. Amorphous nickel is different from cystalic nickel made by electrolytic nickel plating as pure nickel.

In order to improve ductility after heat treatment under air, a three layer structure having selected thicknesses of each metal layer can be advantageously employed. For example, according to a preferred embodiment, electroless copper may be coated on the carbon coating as the first metal layer. Then, an electrolytic copper layer may be deposited on the layer of electroless copper. And finally, electolytic nickel may be deposited on the electrolytic copper as an outer surface. Preferably, the thickness of the electroless copper layer may be minimized because the deposit rate of electroless copper is less than that of electrolytic copper. By minimizing electroless copper thickness, process times can be improved. Moreover, the total thickness of copper (including electroless copper and electrolytic copper) is optimized for ductility after heat treatment. The nickel layer is applied to protect oxidation of copper.

Figure 3:
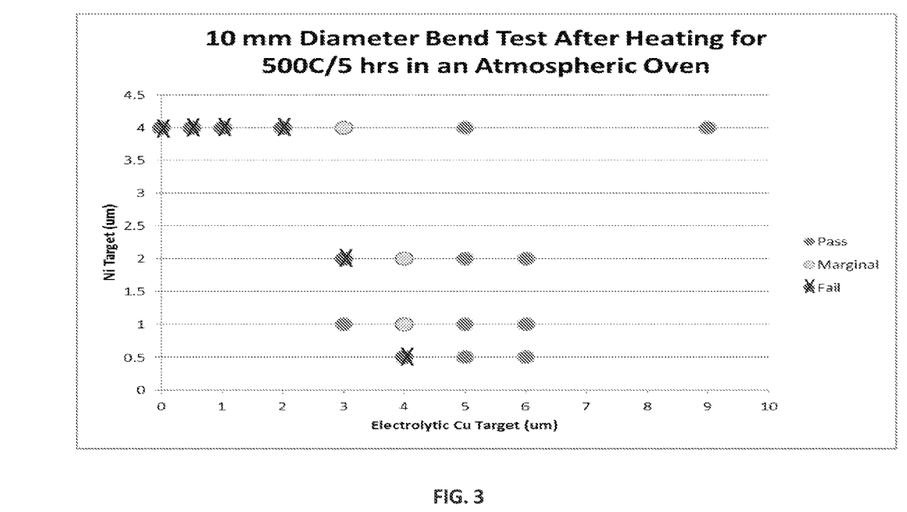
FIG. 3 is a table showing characteristics and performance of various examples of metal-coated optical fiber.

Ductility performance after heating as parameters of copper and nickel thickness is shown in FIG. 3. Each circle or "X" indicates that metal coated fiber having Cu and Ni of various thickness was made and bending test was done after heating. The test results, as indicated, demonstrate that the structure having more than 5 micron of electrolytic copper and more than 0.5 micron of electrolytic nickel showed good ductility against atmospheric heating of 500 deg. C. for 5 hours.

Figure 4:
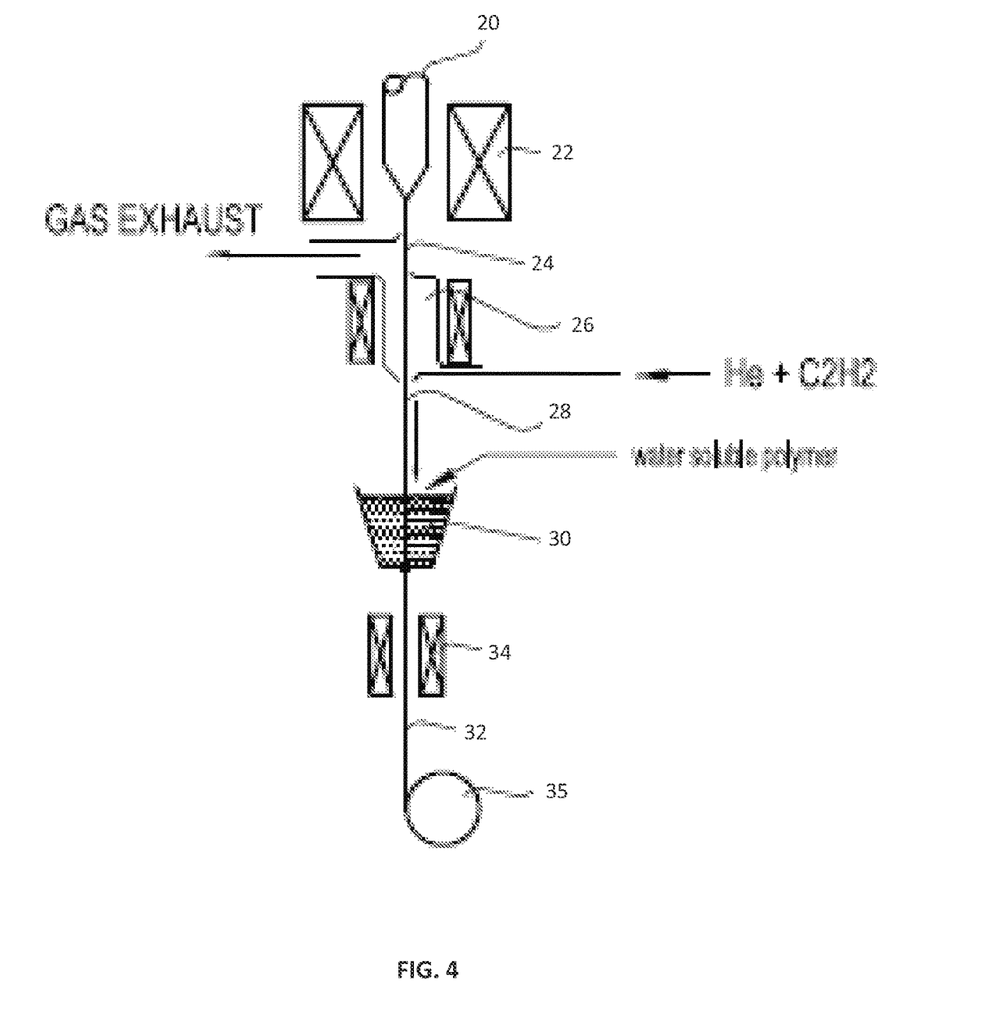
FIG. 4 illustrates an exemplary process for drawing optical fiber and applying a temporary coating thereto.

As noted above, transmission loss performance, in addition to ductility after heat treatment, is an important characteristic for downhole applications. The inventors fabricated long metal coated fiber for evaluation of transmission characteristics. As an example, metal coating thicknesses of six (6) micron of electrolytic copper and one (1) micron of nickel may be utilized. Referring now to FIG. 4, long optical fiber having carbon layer and water soluble polymer may be produced using the illustrated apparatus. In this regard, a single mode fiber preform 20 is heated by heater 22 to a suitable temperature (e.g., 2000 deg. C.). The drawn fiber 24 enters carbon coating furnace 26 in line with the drawing furnace. Acetylene or other hydrocarbons are decomposed thermally and amorphous carbon is deposited on glass surface during passing through the chamber. Then, carbon coated fiber 28 goes through coating die 30 for application of water soluble polymer. In one example, the water soluble polymer may be OKS 8049, Nichigo 20% aqueous solution. The coated fiber 32 passes through a curing oven 34 and is taken up into a reel 35.

Figure 5A:
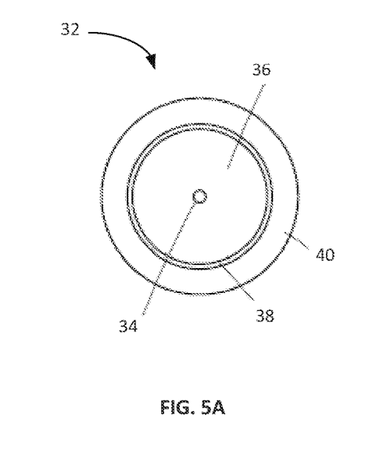
FIG. 5A is a diagrammatic end view of an optical fiber at an intermediate manufacturing step in accordance with the present invention.

The cross section of the temporary coated optical fiber 32 is shown in FIG. 5A. As can be seen, fiber 32 has a core 34, cladding 36, and a carbon coating 38. The temporary polymer coating, which is applied to facilitate handling during intermediate process steps, is shown at 40. The temporary coating 40 may desirably have a thickness of about 10 microns in accordance with some preferred embodiments.

Figure 5B:
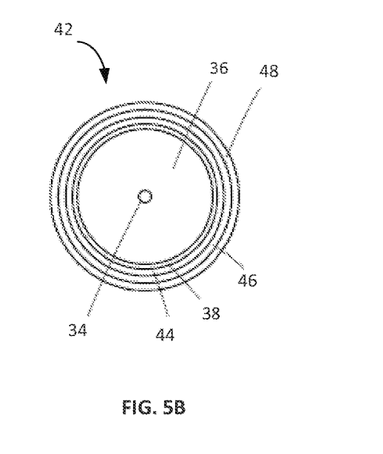
FIG. 5B is a diagrammatic end view of the optical fiber of FIG. 4A at the conclusion of a manufacturing process in accordance with the present invention showing individual metal layers.

FIG. 5B illustrates the final long optical fiber 42 to be produced. Fiber 42 retains core 34, cladding 36 and carbon coating 38. In addition, however, a three-layer metal coating is located on the exterior of carbon coating 38. As noted above, this metal coating may comprise an electroless copper layer 44, an electrolytic copper layer 46, and an electrolytic nickel layer 48 in some presently preferred embodiments. An apparatus and process for producing the long optical fiber 42 will now be described.

Figure 6:
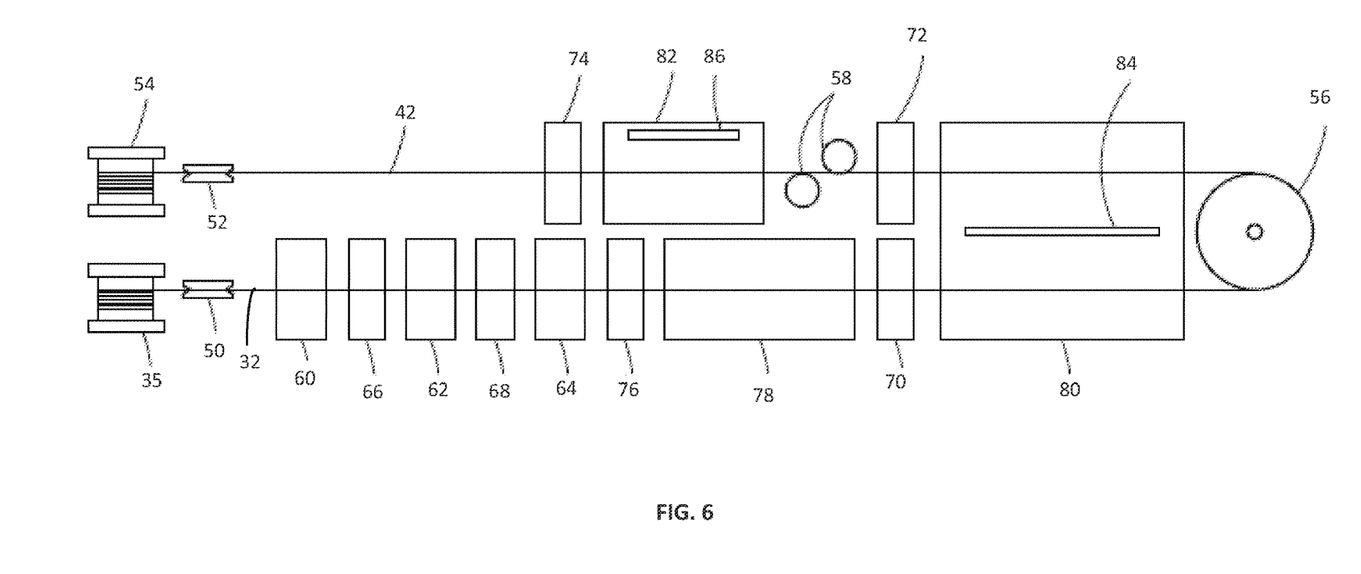
FIG. 6 illustrates an exemplary process for coating optical fiber with metal in accordance with an embodiment of the present invention.

Referring now to FIG. 6, optical fiber 32 (with water soluble polymer) is stocked, such as on reels 35. When necessary, a reel 35 of fiber 32 is served for plating. Specifically, temporary coated fiber 32 is paid off from reel 35 as shown. Pulleys 50, 52 may preferably be provided to determine position of fiber precisely against the input holes of the respective baths. The take-up reel for the finished optical fiber 42 is shown at 54.

Figure 7:
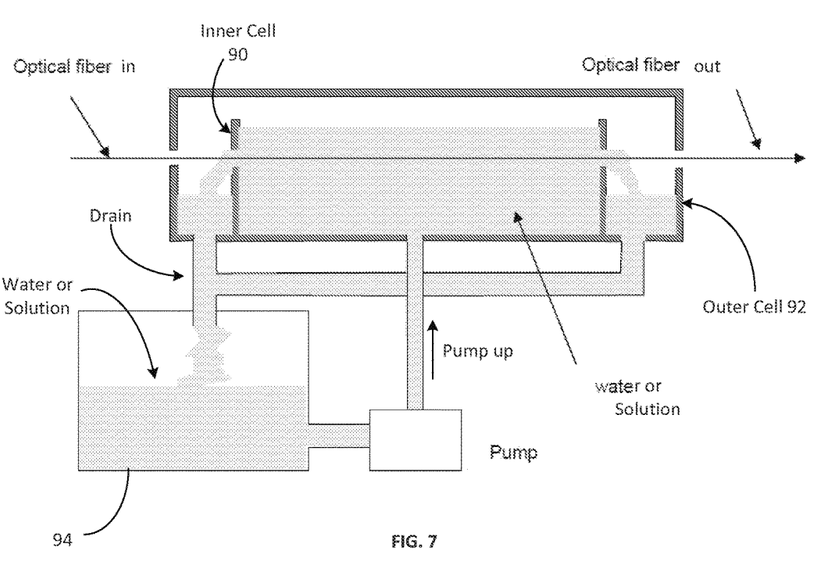
FIG. 7 is a diagrammatic representation of a bath arrangement that may be used in the process of FIG. 6 in accordance with an embodiment of the present invention.

It will be appreciated that the plating process is similar in some respects to that described in application no. PCT/US2014/028151. For example, during the process before sufficient thickness of metal is applied, bare fiber is exposed to solutions without any contact to hard material. In fact, each of the baths to be described is preferably configured such as shown in FIG. 7 to allow entry and exit of the optical fiber without touching any hard material. As will be described, pulleys 56 and 58 are preferably made of conductor so that they are used for cathodes of electrolytic plating.

Fiber 32 first encounters bath 60, which is filled with water for removing the temporary polymer coating. Bath 62 is filled with aqueous solution of tin attachment and bath 64 is filled with aqueous solution of Pd attachment. Baths 66, 68, 70, 72, and 74 are filled with water for rinsing. Bath 76 contains activation solution and bath 78 is filled with aqueous solution of electroless copper.

Baths 80 and 82 are filled with electrical copper aqueous solution and electrolytic nickel aqueous solution, respectively. Anode plates 84 and 86 are located inside of respective baths 80 and 82, and are used for electrolytic plating. When fiber goes through at constant speed, one skilled in the art will appreciate that bath length determines soaking time. The relative length of each bath is thus designed to correspond to relative ratio of soaking times for baths (except for rinsing).

After passing bath 60, the fiber's carbon coating is exposed by dissolving the polymer coating. The bare fiber goes through each solution in the baths without contacting hard material due to the overflow design concept shown in FIG. 7. During bath 78, electroless copper is deposited on the carbon coating. In general, process time is dominated by electroless copper because the deposit rate of electroless copper is slow. In the system shown in FIG. 6, however, electroless plating and electrolytic plating are processed in tandem. So the thickness of copper is formed by not only electroless copper in bath 78 but also electrolytic copper in bath 80 before contacting cathode pulleys 56 and 58. This means the thickness of electroless copper can be reduced as small as possible to give enough conductivity for electrolytic plating. For example, the thickness of electroless copper can be reduced to be less than 0.5 micron because enough thickness of copper, more than 2 micron, is formed by electrical plating before arriving to pulley 56. As can be seen, the optical fiber reenters bath 80 after passing around pulley 56 for additional electrolytic plating of copper. This plating line is designed to form six (6) micron of copper layer and one (1) micron of nickel layer from the thin electroless copper layer which is formed on the carbon coating. The bath solutions may include formaldehyde bath solutions.

FIG. 7 illustrates one configuration of an arrangement that can be used in the process of FIG. 6 to ensure that the optical fiber does not contact anything except the water or process solution (depending on which bath). In this case, fiber passes through exits (i.e., fiber inlet and outlet) of a bath where liquid flows out and below the level of liquid. The bath arrangement includes dual cells, an inner cell (vessel) 90 and an outer cell (vessel) 92. Inner cell 90 contains sufficient liquid such that it flows over from exits at each end (as shown). Outer cell 92 receives the liquid which flows out from inner cell 90 for recirculation. The liquid received by outer cell 92 flows to solution reservoir 94. A slight pulling tension is preferably applied to the fiber so as to cause straight passing through holes or slits of walls without touching.

As shown, solution in reservoir 94 is pumped up into inner cell 90 to keep the fiber immersed in the liquid of the cell. It will be appreciated that the fiber will have a tendency to sag between fiber inlet and fiber outlet due to gravity. Because the liquid inlet into inner cell 90 from the pump is located at bottom of the cell, this tends to push the fiber up by the flow of the liquid. The upward force counteracts the sagging due to gravity and prevents the fiber from contacting hard components, such as the bottom or walls of inner cell 90. The fiber's vertical position will preferably be controlled to keep constant against sag by monitoring position and adjusting the flow rate of the incoming solution, if necessary.

As result of the described arrangement, optical fiber with carbon coating and six (6) micron of copper coating and one (1) micron of nickel coating was obtained in an example. The transmission loss was 1.4 dB/km at 1310 nm and 1.1 dB/km at 1550 nm. The transmission loss is much improved up to 1/10 th of conventional metal coated fiber. The bending test after heating for 5 hrs at 500 deg. C. atmospheric oven showed good ductility.

Regarding metal coating structure, the three layer structure comprising inner electroless copper layer, electrolytic copper layer, and outer nickel layer was found to be good for heat resistant property in atmospheric environment. This is because copper keeps good ductility even after heat treatment and nickel works as protective coating against oxidation because of its low oxidation speed. From the viewpoint of ductility after heating, pure copper is better than alloyed copper with some impurities. Thus, electroless copper or electrolytic copper should preferably be designed to form copper as pure as possible to get enough ductility. Copper is easily oxidized at high temperature under air atmosphere. But oxidized copper is porous, still soft and will not generally give damage to fiber surface after heating. And thicker copper layer works as a buffer layer against outer layer's stress. On the other hand, oxidization speed of nickel is very slow compared with copper although oxidized nickel becomes hard and brittle. Oxidized nickel is not good for inner layer for its hardness, but a nickel layer is good for outer surface as it serves as an oxidation barrier. Inner copper makes a role of protective layer against mechanical propagation of crack or contact of hard and brittle outer layer of nickel.

As parametric study of nickel and copper, copper thickness of more than five (5) micron including electroless copper and more than one (1) micron of electrolytic nickel works well under high temperature, atmospheric environment. As increasing thickness of copper or nickel, the transmission loss increases because the thermal stress at interface between glass and metal increases and then it causes microbending loss. So less than 20 micron of metal layer gives better loss performance than conventional metal coated fibers made by metal freezing method.

The three layer structure is preferably formed by a tandem process of electroless copper plating and electrolytic copper process. The tandem process enables minimizing the thickness of electroless copper because enough thickness for mechanical handling is formed by adding electrolytic copper layer to electroless copper layer. The process time is dominated by the electroless copper for its slow deposit rate compared with electrolytic plating process. This enables enhancement of line speed of production because the fixed length of plating bath and deposit rate limits the process time, that is, plating thickness. The present invention provides a manufacturing method to form enough thickness of metal by adding electrolytic metal deposit to electroless metal deposit tandemly on a optical fiber without contact to hard material until optical fiber contacts with cathode, thus contributing to productivity enhancement.

While preferred embodiments of the invention have been shown and described, modifications and variations may be made thereto by those of ordinary skill in the art without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to be limitative of the invention as further described in the appended claims.

What is claimed is:

1. A method for producing metal-coated optical fiber, said method comprising:
   (a) feeding a length of glass fiber through a first solution bath so as to plate a first predetermined metal on the glass fiber via electroless deposition; and
   (b) passing said length of glass fiber continuously from said first solution bath to a second solution bath adapted to plate thereon a second predetermined metal via electrolytic plating such that said optical fiber contacts an electrode only after at least some of said second predetermined metal has been applied., wherein after exiting said second solution bath said length of glass fiber bends around a first pulley wheel and reenters said same second solution bath.

2. A method as set forth in claim 1, further comprising the step of:
   (c) passing said length of glass fiber continuously from said second solution bath to a third solution bath adapted to plate thereon a third predetermined metal via electrolytic plating.

3. A method as set forth in claim 2, wherein said second predetermined metal is copper and said third predetermined metal is nickel.

4. A method as set forth in claim 3, wherein said first predetermined metal is copper.

5. A method as set forth in claim 4, wherein a combined thickness of said first predetermined metal and said second predetermined metal is at least about 5 microns.

6. A method as set forth in claim 5, wherein a thickness of said first predetermined metal is no greater than about 0.5 microns.

7. A method as set forth in claim 4, wherein a thickness of said third predetermined metal is at least about 0.5 microns.

8. A method as set forth in claim. 1, wherein said glass fiber has a carbon layer.

9. A method as set forth in claim 1, wherein said electrode comprises a first electrode integrated into the first pulley wheel.

10. A method as set forth in claim 9, wherein an additional thickness of said second predetermined metal is plated on said length of glass fiber after contacting said first pulley wheel.

11. A method as set forth in claim 10, wherein said length of glass fiber further contacts a second electrode integrated into a second pulley wheel after said additional thickness of said predetermined metal has been plated thereon.

12. A method as set forth in claim 1, wherein said length of glass fiber is initially coated with a polymer coating that is removed prior to said first solution bath.

13. A method as set forth in claim 12, wherein said polymer coating is water soluble.

14. A method as set forth in claim 1, wherein said first and second solution baths each comprise a vessel having an inlet hole and an outlet hole through which the length of glass fiber passes into and out of said vessel, an associated solution flowing out of said inlet and outlet holes.

\* \* \* \* \*